United States Patent [19]
Williams

[11] Patent Number: 5,826,120
[45] Date of Patent: Oct. 20, 1998

[54] ONE-WAY WINDER, FILM ADVANCE AND CAMERA

[75] Inventor: Patricia L. Williams, Rochester, N.Y.

[73] Assignee: Eastman Kodak Company, Rochester, N.Y.

[21] Appl. No.: 960,932

[22] Filed: Oct. 30, 1997

[51] Int. Cl.⁶ ..................................................... G03B 1/00
[52] U.S. Cl. .......................... 396/396; 396/401; 396/411; 396/413
[58] Field of Search .................................... 396/387, 388, 396/395, 396, 401, 411, 413, 416

[56] References Cited

U.S. PATENT DOCUMENTS

| | | | |
|---|---|---|---|
| 1,317,034 | 9/1919 | Pirwitz | 396/396 |
| 1,812,182 | 6/1931 | Thompson | 396/396 |
| 4,032,940 | 6/1977 | Chan | 396/348 |
| 4,193,678 | 3/1980 | In Son | 396/401 |

FOREIGN PATENT DOCUMENTS 499544  1/1939  United Kingdom .

*Primary Examiner*—Eddie C. Lee
*Attorney, Agent, or Firm*—Robert Luke Walker

[57] ABSTRACT

A one-way winder having a body defining a bifurcated guideway. The guideway has a trunk and first and second branches. The guideway has at least one portal connecting the branches. The director is disposed in the body. The director has an arm-pawl and a guide cam. The director is movable relative to the body in forward and return movements. The guide cam moves along the first branch during the forward movement and along the second branch during the return movement. The guide cam moves unidirectionally along the first branch. An endless ratchet disposed in the body, intrudes into the first branch. The ratchet is driven by the arm-pawl during the forward movement and is spaced apart from the arm-pawl during the return movement. A film advance and camera include the one way winder.

20 Claims, 15 Drawing Sheets

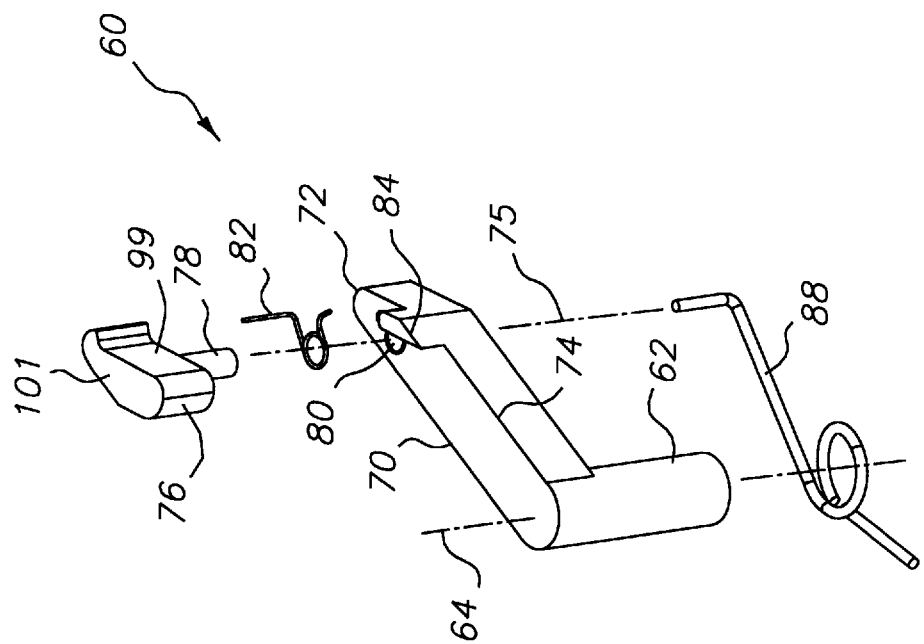
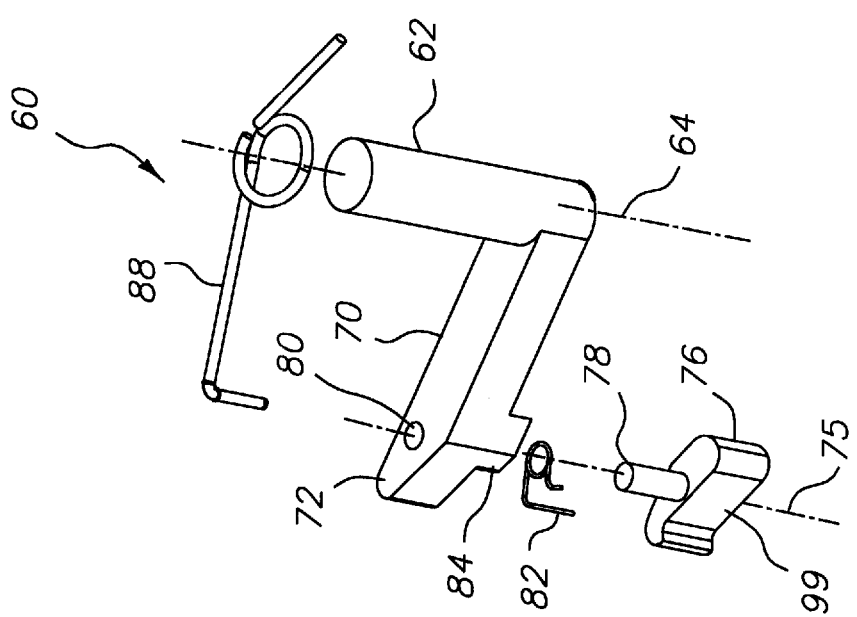

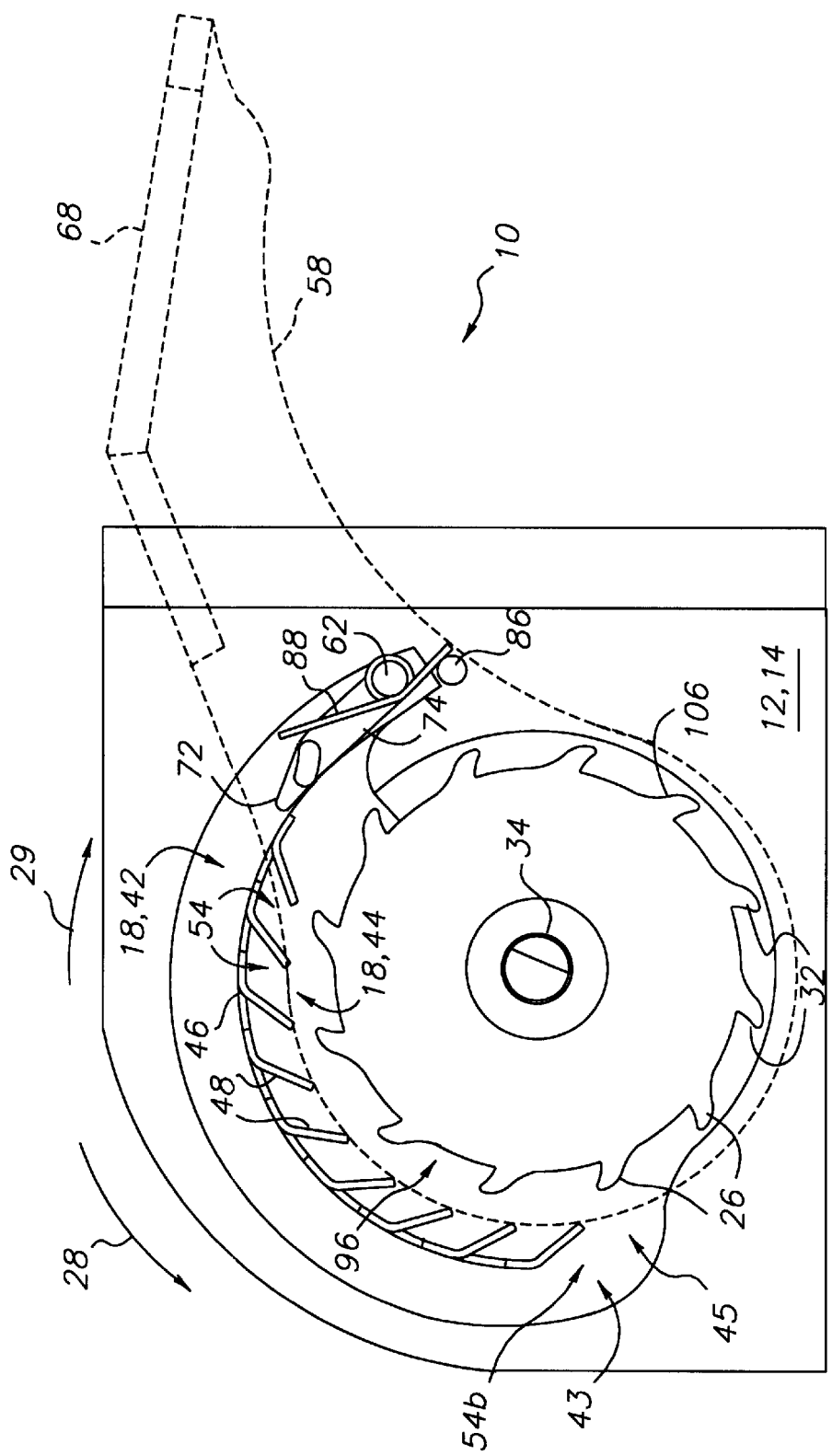

ONE-WAY WINDER, FILM ADVANCE AND CAMERA

FIELD OF THE INVENTION

The invention relates to photography and one-way mechanical mechanisms and more particularly relates to an improved one-way winder, film advance, and camera.

BACKGROUND OF THE INVENTION

One-way motion has long been provided by the use of ratchet and pawl mechanisms. In a typical application, a pawl drives a ratchet when the pawl is rotated in a first direction. In a second direction, the pawl rides over the teeth or steps of the ratchet. A biasing force on the pawl causes the pawl to engage each tooth or step, in turn, before the pawl rides over to the next. The sequence of engagements causes the characteristic "ratcheting noise" associated with the use of a ratchet and pawl mechanism.

Photographic film cameras commonly utilize one-way rotation of film spools to advance film and preclude rotation in an opposite direction unless an overt action is taken. Some cameras have a winding knob or thumbwheel which rotates a ratchet wheel relative to a fixed pawl. Reverse rotation is precluded, but winding in an advance direction is associated with a ratcheting noise. Other cameras have an advance lever or other winding member, which rotates the ratchet and pawl in an advance direction and has the pawl ride over the ratchet in a reverse direction. The recovery stroke for the advance lever causes the ratcheting noise.

Ratcheting noise can be reduced by adding camera features that isolate or deaden the sound and can be eliminated by use of a motorized film advance that excludes a ratchet and pawl. Either approach tends to increase camera weight, complexity, and cost.

It would thus be desirable to provide an improved one-way winder, film advance, and camera; in which ratcheting noise from the winder is reduced or eliminated.

It would further be desirable to provide an improved one-way winder, film advance, and camera; in which the winder is simple and light weight.

SUMMARY OF THE INVENTION

The invention is defined by the claims. The invention, in its broader aspects, provides a one-way winder having a body defining a bifurcated guideway. The guideway has a trunk and first and second branches. The guideway has at least one portal connecting the branches. The director is disposed in the body. The director has an arm-pawl and a guide cam. The director is movable relative to the body in forward and return movements. The guide cam moves along the first branch during the forward movement and along the second branch during the return movement. The guide cam moves unidirectionally along the first branch. An endless ratchet disposed in the body, intrudes into the first branch. The ratchet is driven by the arm-pawl during the forward movement and is spaced apart from the arm-pawl during the return movement. A film advance and camera include the one way winder.

It is an advantageous effect of at least some of the embodiments of the invention that an improved one-way winder, film advance, and camera are provided in which ratcheting noise from the winder is reduced or eliminated.

It is also an advantageous effect of at least some of the embodiments of the invention that an improved one-way winder, film advance, and camera are provided in which the winder is simple and light weight.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 5 is a top, exploded, perspective view of the stem and director of the winder of FIG. 1.

FIG. 6 is a bottom, exploded, perspective view of the stem and director of the winder of FIG. 1.

FIG. 8a is a semi-diagrammatical top view of another embodiment of the one-way winder of the invention. The handle is indicated by dashed lines and is shown in a fully returned position. The arm-pawl is in a retracted orientation and the guide cam and nearest adjoining slat are in a non-deflected condition.

DETAILED DESCRIPTION OF THE INVENTION

Figure 1:
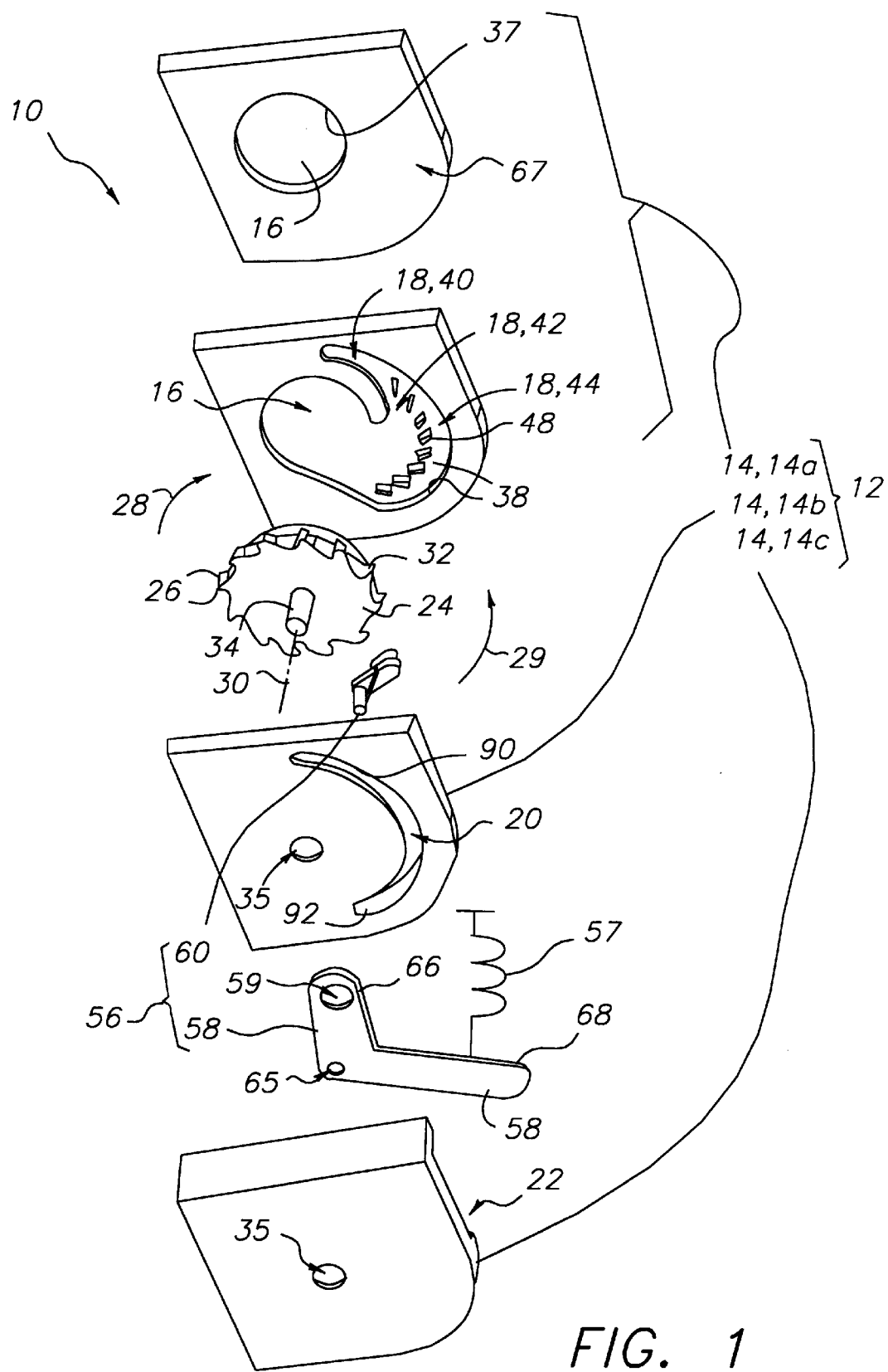
FIG. 1 is an exploded, bottom, left perspective view of an embodiment of the one-way winder of the invention.

The one-way winder 10 has a body 12 that supports other components of the winder 10. The body 12 has multiple panels 14. (FIG. 1 illustrates a winder 10 having a top panel 14a, a middle panel 14b, and a bottom panel 14c. The top panel 14a is illustrated in two parts for clarity.) Each of the panels 14 can be a single plastic casting such as an injection molding. The panels 14 are stacked together and held in place by adhesive, fasteners or the like. The panels 14 define internal cavities in the body 12 including: a ratchet receiver 16, a guideway 18, a pathway 20, and a handle slot 22. In the embodiment of the invention shown in FIGS. 1–7, the ratchet receiver 16 and guideway 18 are contiguous and delineate a single, stepped recess in the top panel 14a.

An endless ratchet 24 is disposed in the ratchet receiver 16. The ratchet 24 has a circumference bearing an array of outwardly facing teeth 26, preferably evenly spaced. The ratchet 24 is cyclically movable in a forward direction 28 in a rotation or revolution about a ratchet axis 30 that is perpendicular to a plane defined by the guideway 18. The teeth 26 have engagement portions 32 that face in the same direction and, preferably, are uniformly spaced apart about the ratchet circumference.

In the embodiment of the invention shown in FIGS. 1–7, the ratchet 24 has the shape of a toothed disc and is trapped between the top and middle panels 14a, 14b. The ratchet 24 rotates about a ratchet axle 34 concentric with the ratchet axis 30. The ratchet axle 34 extends through a hole 35 in one or more of the panels 14. Opposite the axle 34 is a secondary bearing surface 36, in the form of a disc, or cylinder, or the like; that fits in a complementary shaped bearing surface 37 of the adjoining panel 14. The ratchet 24, in the embodiment of the invention shown in FIGS. 8a–11 is similar to that of FIGS. 1–7.

Figure 12:
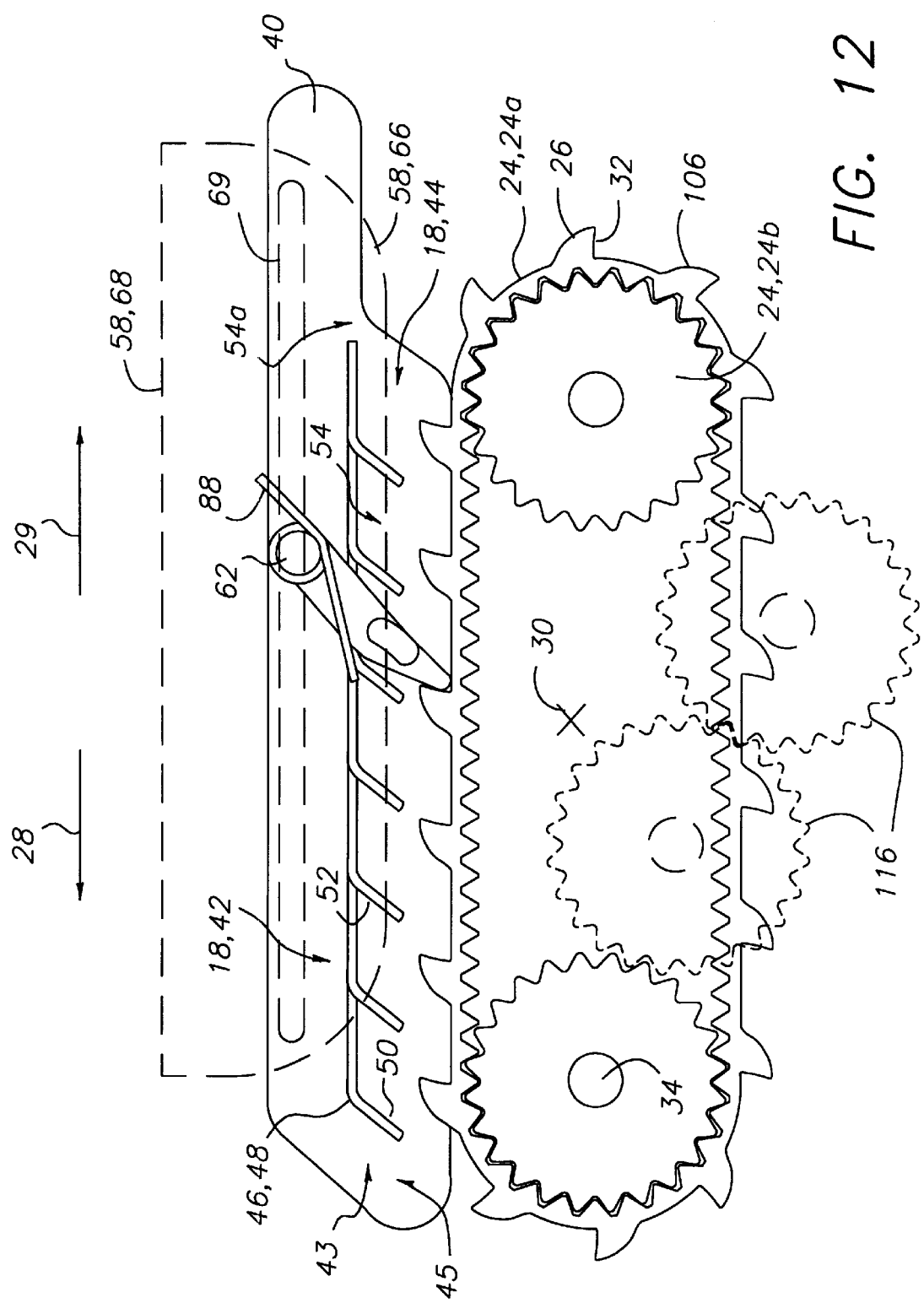
FIG. 12 is a semi-diagrammatical top view of yet another embodiment of the one-way winder of the invention. The handle is indicated by dashed lines and is shown in an intermediate position. The arm-pawl is in an extended orientation and is biased toward the ratchet. The guide cam and nearest adjoining slat are in a non-deflected condition.
Figure 13:
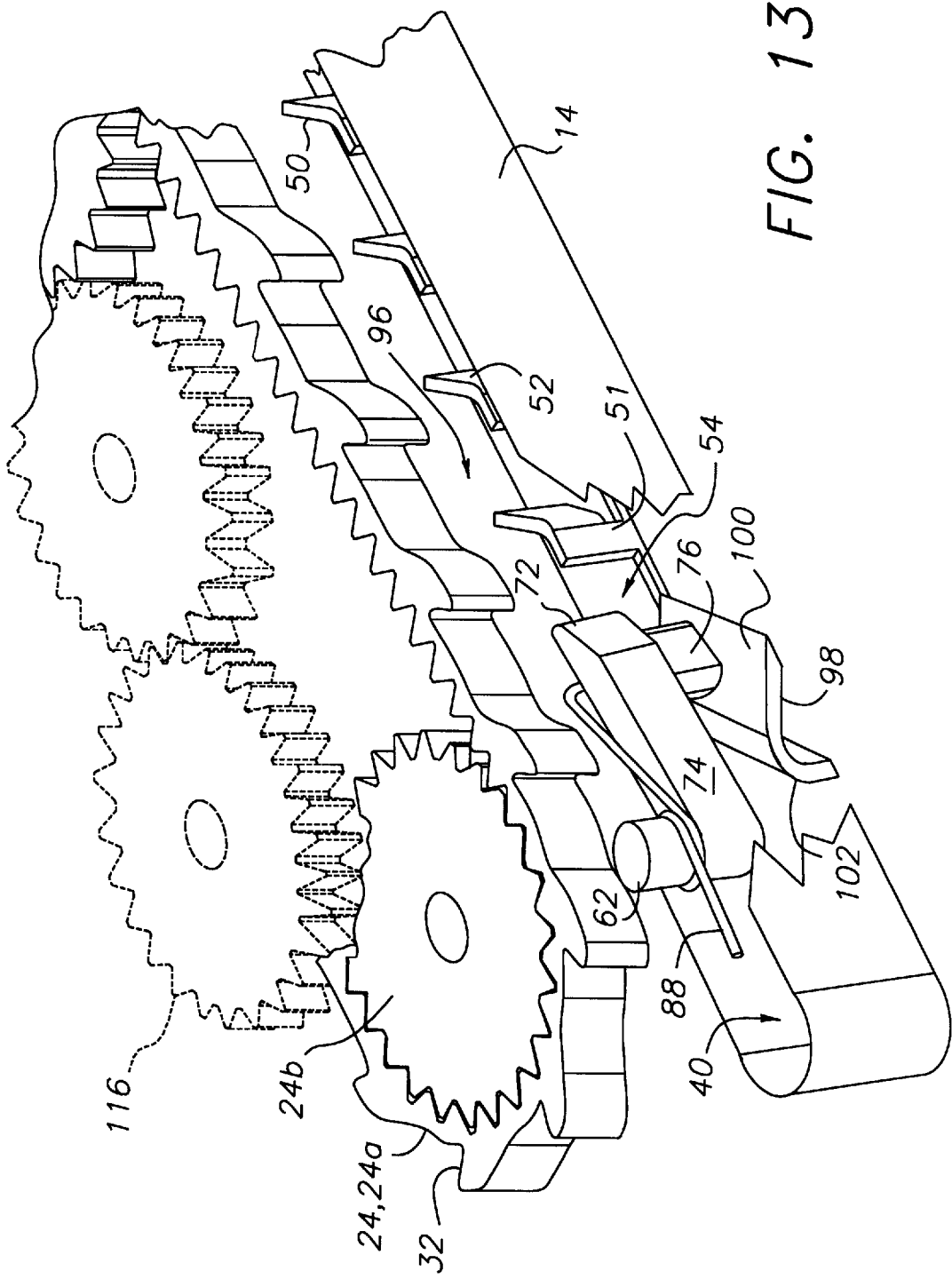
FIG. 13 is a partially cut-away, top, rear, perspective view of still another ratchet winder of the invention. The arm-pawl is in a retracted orientation and is biased away from the ratchet. The guide cam and nearest adjoining slat are in a non-deflected condition.

In the embodiment of the invention shown in FIGS. 12–13, the ratchet 24 has a sprocket chain 24a carried by a pair of spaced apart sprocket wheels 24b. The ratchet 24 can be mounted in the body 12, in a manner similar to that shown in FIGS. 1–7; however, each sprocket wheel 24b of the ratchet 24 has a ratchet axle 34 and the ratchet axis (indicated by an "X" in FIG. 12) is a line extending through the geometric center of ratchet 24.

The guideway 18 is delimited by panel surfaces 38 and the ratchet 24. The guideway 18 has a blind trunk 40 that bifurcates into first and second branches 42,44. The guideway branches 42,44 are parallel and the two branches 42,44 are separated by a fence 46. The guideway 18 extends from the trunk 40 to a pair of tail ends 43,45 of the branches 42,44.

The fence 46 is joined to one or more of the body panels 14. The fence 46 can be made as a separate part and then attached or can be part of a unitary molding with the respective panel 14. In the embodiment of FIGS. 1–7, the guideway branches 42,44 curve along the flat, upper step of the recess and the fence 46 is a unitary part of the panel 14 and protrude directly outward from the recess surface 38. In the embodiment of FIGS. 8a–11, the fence 46 is a separate piece friction fit onto the panel 14 by means of a gap 47 in a support portion 49 of the fence 46. In the embodiments of FIGS. 12 and 13, the fence 46 is a separate piece attached to the panel 14 by some means, such as friction fit, or fasteners, or adhesive.

The fence 46 has a plurality of slats 48, preferably three or more. Each slat 48 has the shape of a roughly rectangular plate or narrow wedge. The slats 48 each have a longest dimension that extends transverse to the longer dimensions of the branches 42,44. The slats 48 each, preferably, join the branches 42,44 at about the same angle to a tangent to the respective branch at the point where the slat 48 joins the branch. The slats 48 have opposed forward-guiding and return-guiding surfaces 50,52 roughly paralleling the longest dimension. The forward-guiding surfaces 50 face generally toward the trunk 40 of the guideway 18. The return-guiding surfaces 52 face in substantially the opposite direction from surfaces 50. In the embodiments shown in FIGS. 8a–11, and 13, the slats 48 are each attached to the support portion 49 by a neck 51.

The slats 48 define a sequence of portals 54 that extend obliquely outward and upstream from the first branch 42 into the second branch 44. Except for terminal portals 54a,54b, each portal 54 is bordered on one side by the forward-guiding surface 50 of one slat 48 and on the other side by the return-guiding surface 52 of the preceding slat 48. The initial portal 54a and final portal 54b are bordered on the upstream side and downstream side, respectively, by portions of the margin 38 of the recess. Each slat 48 at least partially blocks the first branch 42.

The ratchet 24 partially intrudes into the first branch 42. This intrusion can reach the slats 48, but it is preferred that the ratchet 24 be capable of its cyclical rotation or revolution without touching the slats 48.

An actuator 56 is disposed in the body 12. The actuator 56 is movable, relative to the body 12, in forward and return directions (indicated by arrows 28 and 29, respectively) between fully returned and fully advanced positions. The movement defines a plane extending through teeth 26 of the ratchet 24. The range of movement provided is not critical and for a particular one-way winder 10 is a function of its use. For a rotating one-way winder 10, like those shown in FIGS. 1–7 and 8a–11, a convenient range of pivoting is about 90 to 270 degrees. For sliding one-way winders 10, like those shown in FIGS. 12 and 13, a convenient range of reciprocation is about one-quarter to one-half the circumference of the ratchet 24.

The actuator 56 includes a handle 58 disposed in the handle slot 22, a director 60 trapped in the guideway 18, and a stem 62 that extends through the pathway 20 and connects the handle 58 and the director 60. The pathway 20 is parallel to, but offset from the guideway 18. The stem 62 has a pivot axis 64 that remains in constant substantially parallel relation to the ratchet axis 30 as the stem 62 rides along the pathway 20 during actuator movement. The stem 62 is freely movable in the pathway 20.

The handle 58 has a mount portion 66 that holds the handle 58 within the handle slot 22 and a access portion 68 that is manipulated directly by the user or by a motor or other mechanism under the direction or control of the user. The handle 58 is biased by a handle spring 57 toward the fully returned position. The two portions 66,68 can form a unitary casting or the like, or can be separate pieces. The configuration of the handle 58 is not critical. For example, the handle 58 can be an advance lever, or a knob, or a thumbwheel. In the embodiment of FIGS. 1–7, the handle 58 is a flat, V-shaped advance lever that pivots in forward and return directions over less than a full circle. The mount portion 66 has a hole 59 that loosely receives the axle of the ratchet 24. The handle 58 of the embodiment of FIGS. 8a–11 is similar. The handle 58 of the embodiments of FIGS. 12 and 13 (shown in FIG. 12) is an elongate bar which reciprocates linearly in forward and return directions. The mount portion 66 has a holding feature 69 in the form of a cavity or protrusion, or the like; that, with a complementary structure in the body (not shown) retains the handle 58 in the handle slot.

The director 60 is pivotable about the pivot axis 64, relative to the guideway 18 and the handle 58. The stem 62 can be fixed to either the director 60 or the handle 58 and pivotably mounted to the other, or the stem 62 can be pivotably mounted to both the director 60 and the handle 58. If desired, for example, if large manufacturing tolerances are expected; the stem 62 can extend through a hole 65 in the handle 58 and into a secondary pathway 20 provided in the bottom panel 14c (not shown). Similarly, if desired an upward extension of the stem (not shown) can provide a secondary stem to extend into an additional secondary pathway (localized by arrow 67) in the top panel 14a. In the embodiment shown in FIGS. 1–7, for example, the director 60 is trapped between the top and middle panels 14a, 14b, the pathway 20 is located within a slot in the middle panel 14b, and the handle 58 is trapped between the middle and bottom panels 14b, 14c. The middle and lower panels 14b, 14c and an inner end of the handle 58 have openings 36,59 for the axle of the ratchet 24. The stem 62 is fixed to the director 60 and the hole 65 in handle 58 loosely receives the stem 62. The pathway 20 followed by the stem 62 is inset within the slot in the middle panel 14b and there is little or no contact between the stem 62 and the middle panel 14b during actuator 56 movement.

The director 60 has an arm-pawl 70 having opposed first and second ends. The first end is connected to the stem 62. A pawl 72 is disposed at the second end. In the embodiments of the invention shown in the figures, the pawl 72 is the narrowed, rounded nose of the integral arm-pawl 70. The arm-pawl 70 is pivotable about the pivot axis 64, relative to the body 12 and the handle 58. The pawl 72 is aligned with the teeth 26, in a direction parallel to the ratchet axis 30. The pawl 72 is shaped at least roughly complementary to the shape of the engagement portions 32 of the teeth 26. Between the pawl 72 and the first end, the arm 74 of the arm-pawl 70 is joined to a guide cam 76.

The guide cam 76 is mounted in fixed or movable relation to the arm-pawl 70. The guide cam 76 is constrained within the guideway 18 and is movable, within the guideway 18, between and through the branches 42,44. The slats 48 allow movement of the guide cam 76 through respective portals 54 in both inward and outward directions 77,79, toward and away from the ratchet 24, respectively. In the embodiment of the invention of FIGS. 1–7, the guide cam 76 is discrete from the arm-pawl 70. The guide cam 76 is roughly lozenge-shaped with its longer dimensions paralleling those of the arm-pawl 70. The guide cam 76 is mounted to the arm-pawl 70 by means of a peg 78 and matching hole 80 in the arm-pawl 70 and is pivotable relative to the arm-pawl 70, about a cam axis 75 extending longitudinally through the peg 78. The guide cam 76 is biased toward substantial alignment of the longer dimensions of the guide cam 76 and arm-pawl 70, by a cam spring 82 which acts against a stop 84. In the embodiments of FIGS. 8a–11, and 12, and 13, the guide-cam 76 is fixed to the arm-pawl 70 with the longer dimensions of the guide cam 76 and arm-pawl 70 in substantial alignment.

During movement of the actuator 56 between the fully returned and fully advanced positions, the director 60 moves along the guideway 18 and the stem 62 reciprocates in the pathway 20. The director 60 can travel in the forward direction from the trunk 40 along the guideway 18 toward the tail ends 43,45; and in a return direction of travel from a tail end 43,45 along the guideway 18 toward the trunk 40. The guide cam 76 moves along the first branch 42 during forward movement and along the second branch 44 during return movement. The guide cam 76 encounters the slats 48, which guide the travel of the director 60 and cause the angular relation between the director 60 and the handle 58 to change as the actuator 56 moves. The director 60 pivots about the pivot axis 64, relative to the guideway 18 and the rest of the body 12; between an extended orientation, in which the director 60 is substantially aligned with the nearest adjoining slat 48 in a direction parallel to the ratchet axis 30; and a retracted orientation, in which the director 60 extends transverse to adjoining slats 48. The director 60 is in the retracted orientation when the guide cam 76 is in the second branch 44 and is in the extended orientation when the guide cam 76 is in the first branch 42 or the trunk 40. The director 60 is preferably biased, in a clockwise or counterclockwise direction, toward either the retracted orientation or the extended orientation.

In the embodiment of the invention shown in FIGS. 8a–11, the director 60 is biased toward the extended orientation by a director biasing spring 88 which bears on the arm-pawl 70 and a bolster portion 86 of the handle 58. The embodiments of the invention of FIGS. 1–7, and 12 have director biasing springs that operate in the same manner. In the embodiment of the invention of FIG. 13, the director 60 is biased toward the retracted orientation by the director biasing spring 88.

The director 60 moves through the guideway 18 as follows. Starting with the handle 58 in the fully returned position, the handle 58 is moved in the forward direction. The stem 62 moves with the handle 58 from the head end 90 of the pathway 20 toward the tail end 92 of the pathway 20. Simultaneously, as the handle 58 is moved forward, the guide cam 76 moves out of the trunk 40 of the guideway 18 and enters a portal 54. In the embodiments of the invention of FIGS. 1–7, 8a–11, and 12, the director is biased toward the ratchet 24 by the biasing spring 88 and pivots into the portal 54, under the action of the spring 88 upon leaving the trunk 40. In the embodiment of the invention of FIG. 13, the director is biased away from the ratchet 24 by the biasing spring 88. In this embodiment of the invention, an entry guide 98 is mounted in the guideway 18 at the outer end of the initial portal 54a. The entry guide 98 acts as a one-way gate allowing return movement of the guide cam 76 along the second branch to the trunk 40; but deterring movement of the guide cam 76 in a forward direction along the second branch. In this embodiment, the guide cam 76, upon leaving the trunk 40, meets the entry guide 98 and is channeled into the initial portal 54a. The entry guide 98 is configured to present different barriers to travel in the two directions. For example, the entry guide 98 in FIG. 13 presents a moderately sloped surface 100 when approached by the guide cam 76 in a return movement; but presents a steeply sloped surface 102 when approached by the guide cam 76 from the trunk 40. (This embodiment requires some movement of the director 60 out of the plane of the guideway 18. The required movement can be provided simply by free play or the director 60 can be mounted for sliding or pivoting and be spring-loaded toward the guideway 18.) Similarly, the entry guide 98 can be configured to flex readily in one direction and not in the opposite direction.

The movement of the guide cam 76 into the portal 54 causes the director 60 to pivot about the pivot axis 64 from the retracted orientation to the extended orientation. Continuing forward movement of the handle 58 causes a leading edge 99 of the guide cam 76 to bear against the forward-guiding surface 50 of the adjoining, downstream slat 48 and drives the guide cam 76 through the portal 54, and into the first branch 42. The movement of the director 60 continues and the guide cam 76 reaches the end of the slat 48, and the pawl 72 enters an area 96, within the first branch 42, swept by the teeth 26 of the ratchet 24. As the guide cam 76 moves through the first branch 42, the pawl 72 contacts the engagement portion 32 of a tooth 26 and pushes the ratchet 24 in the forward direction.

When entering the first branch 42, the guide cam 76 remains in contact with the adjoining, downstream slat 48. Each slat 48 is positioned in the first branch 42 to interfere with the guide cam 76 as the director 60 is moved along the first branch 42. The slats 48 block movement of the guide cam 76 within the first branch 42 between the portals 54 in the return direction, but allow movement of the guide cam 76 within the first branch 42 between the portals 54 in the forward direction. The guide cam 76, or the encountered downstream slat 48, or both deflect relative to the guideway 18 and body 12. When the guide cam 76 and the encountered slat 48 are in the deflected condition, passage of the guide cam 76 to the succeeding portal 54 is allowed. The specific manner of the deflection is not critical and one or both of the guide cam 76 and the slat 48 can, for example; pivot, or slide, or bend, or the like. The deflection is resilient. The resilience can be a function of the material used for one or both of the guide cam 76 and slat 48 or can be provided by a separate resilient member, such as cam spring 82.

In the non-deflected condition, the guide cam 76 is generally aligned with the arm-pawl 70 and approximately parallel to the slats 48. In the deflected condition, the guide cam 76 is transverse to the slats 48. A cam spring urges pivoting of the guide cam 76 into the non-deflected configuration. The central part of the leading edge of the guide cam 76 is indented to help the guide cam 76 clear the encountered slat 48. In the embodiment of FIGS. 1–7, the guide cam 76 is mounted so as to pivot about the cam axis 75 through the arm-pawl 70. As the pawl 72 starts to move the ratchet 24, the leading edge 99 of the guide cam 76 impinges against the inner end of a slat 48. The guide cam 76 rotates in contact with the slat 48 until the leading edge 99 clears the slat and the guide cam can move past. The guide cam 76 then rotates past under the action of the cam spring 82. In the embodiments of FIGS. 8a–11, and 12, and 13, the guide cam 76 is fixed to the arm-pawl 70 and the slats 48 deflect out of the way as the guide cam 76 travels through the first branch 42. Since the slats 48 each extend between the branches 42,44 at an oblique angle upstream from the first branch 42 to the second branch 44; the slats 48 must only deflect slightly (preferably about 10 or 20 degrees, but necessarily no more than 45 degrees) for the guide cam 76 to move past. Movement of the guide cam 76 in the return direction along the first branch 42 is precluded, since such movement would require deflection of the slats 48 over more than ninety degrees.

As the guide cam 76 passes, one or both of the guide cam 76 and the encountered slat 48 deflect. Materials for the guide cam 76 and slats 48 can be selected so that the deflection is silent or substantially silent. For example, a winder 10 used in a one-time use camera can be made from the same polymers as other mechanical components of the camera.

When the guide cam 76 has moved past the slat 48, the guide cam 76 and passed slat 48 reassume a non-deflected condition. Continued movement of the handle 58 in the forward direction causes the guide cam 76 to meet the next slat 48 and the guide cam 76 and that slat 48 to assume a deflected condition. The process is continued until the end of the first path is reached. The guide cam 76 then encounters the margin 38 of the recess and further movement in the forward direction is not possible. The user can then move the handle 58 in the return direction. When return movement of the handle 58 is initiated, the pawl 72 travels in the return direction along the first branch 42 until a trailing edge 101 of the guide cam 76 encounters the return-guiding surface 52 of the nearest upstream slat 48. Further movement of the guide cam 76 along the first branch 42 in the return direction is blocked. The slope of the return guiding surface 52 causes the guide cam 76 to instead be displaced away from the swept area 96 and to travel outward through the portal 54 to the second branch 44 of the guideway 18. The teeth 26 of the ratchet 24 can each have a guide portion 106 opposite the engagement portion 32, sloped in the same direction as the return guiding surface 52 to guide the pawl 72 toward the second branch 44. The preceding description assumes full travel of the actuator 56 in the forward and return directions. The user is free to move the actuator 56 only part way along the first branch 42 before returning to the second branch 44. Similarly, the user can decide to again forward the actuator 56 after only a partial return movement along the second branch 44. The above description still applies, with the proviso that the portals 54 navigated by the director 60 will vary.

Figure 2:
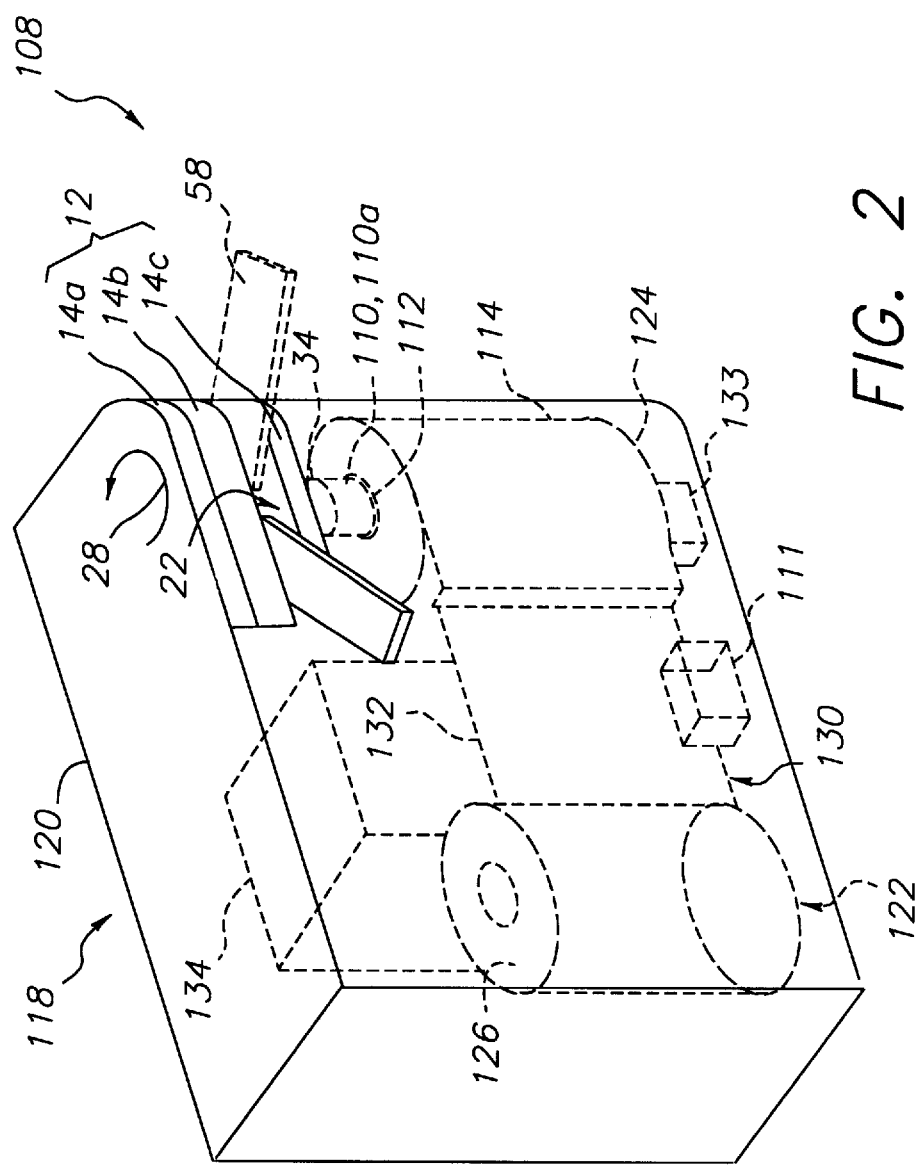
FIG. 2 is a semi-diagrammatical, top, left, rear perspective view of an embodiment of the camera of the invention, which includes an improved film advance of the invention incorporating the one-way winder of FIG. 1. The locations of the handle is indicated in solid lines in a fully returned position and in dashed lines in a fully advanced position. The locations of a cartridge and film are indicated by dashed lines. An exposure system is indicated diagrammatically by a dashed cube positioned forward of the film.
Figure 3C:
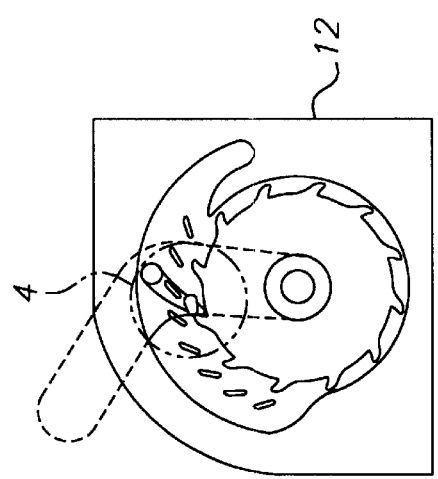
FIG. 3c is the same view as FIG. 3a, but the winder is in a second intermediate position, the arm-pawl is in the extended orientation, and the guide cam and nearest adjoining slat are in a deflected condition.
Figure 3B:
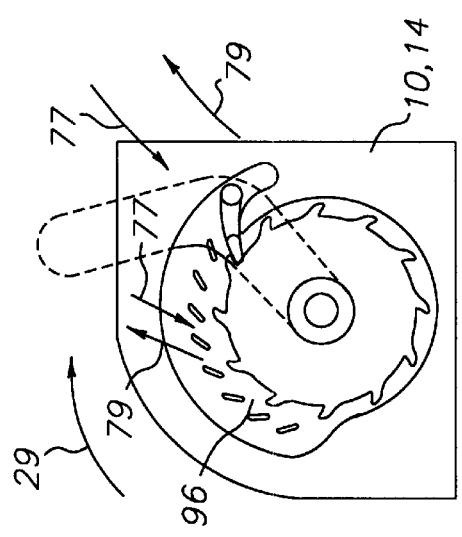
FIG. 3b is the same view as FIG. 3a, but the winder is in a first intermediate position, the arm-pawl is in an extended orientation, and the guide cam and nearest adjoining slat are in a non-deflected condition.
Figure 3A:
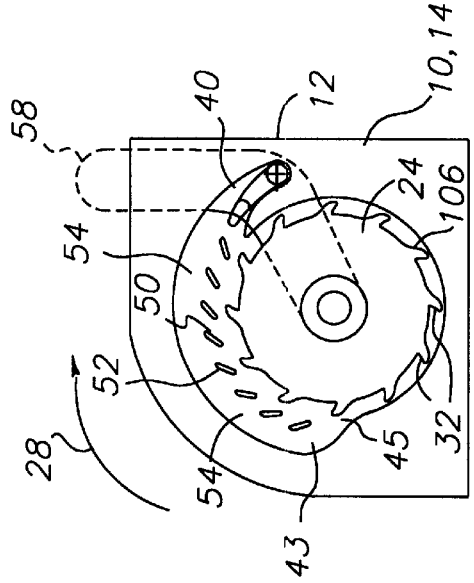
FIG. 3a is a semi-diagrammatical top view of the one-way winder of FIG. 1. The handle is indicated by dashed lines and is shown in a fully returned position. The arm-pawl is in a retracted orientation and the guide cam and nearest adjoining slat are in a non-deflected condition.
Figure 4:
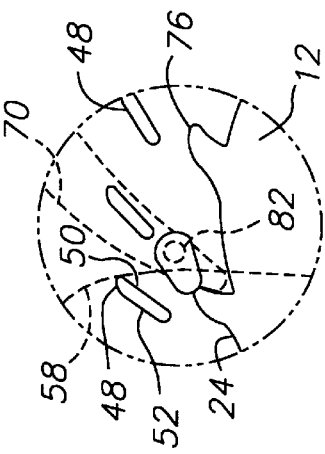
FIG. 4 is an enlarged view of a part of FIG. 3c indicated by a dashed circle "A". The arm-pawl and cam spring are shown by dashed lines for clarity.
Figure 3E:
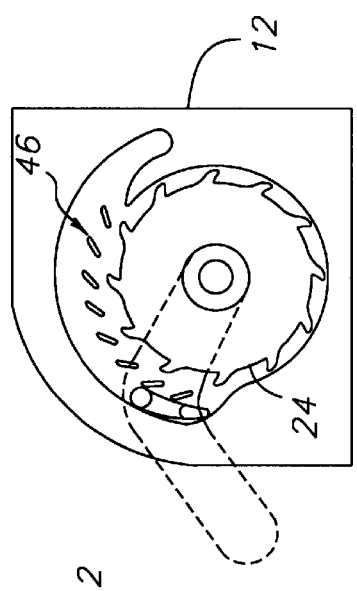
FIG. 3e is the same view as FIG. 3a, but the winder is in a fourth intermediate position, the arm pawl is in the retracted orientation, and the guide cam and nearest adjoining slat are in a non-deflected condition.
Figure 3D:
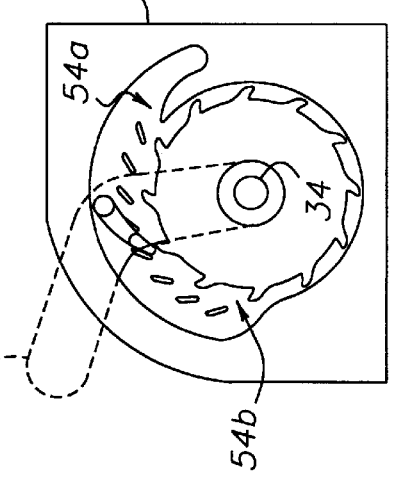
FIG. 3d is the same view as FIG. 3a, but the winder is in a third intermediate position, the arm pawl is in a transitional orientation, and the guide cam and nearest adjoining slat are in a non-deflected condition.
Figure 7:
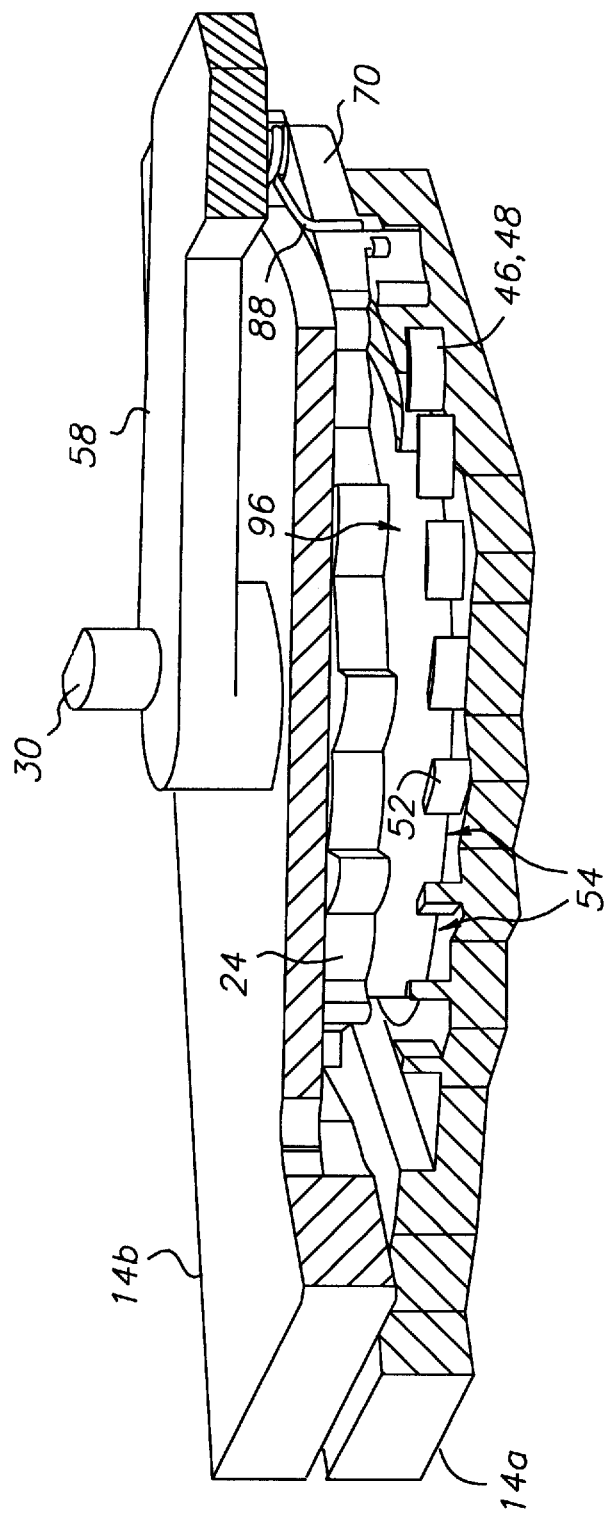
FIG. 7 is a partially cut-away, rear, bottom perspective view of the winder of FIG. 1.
Figure 8B:
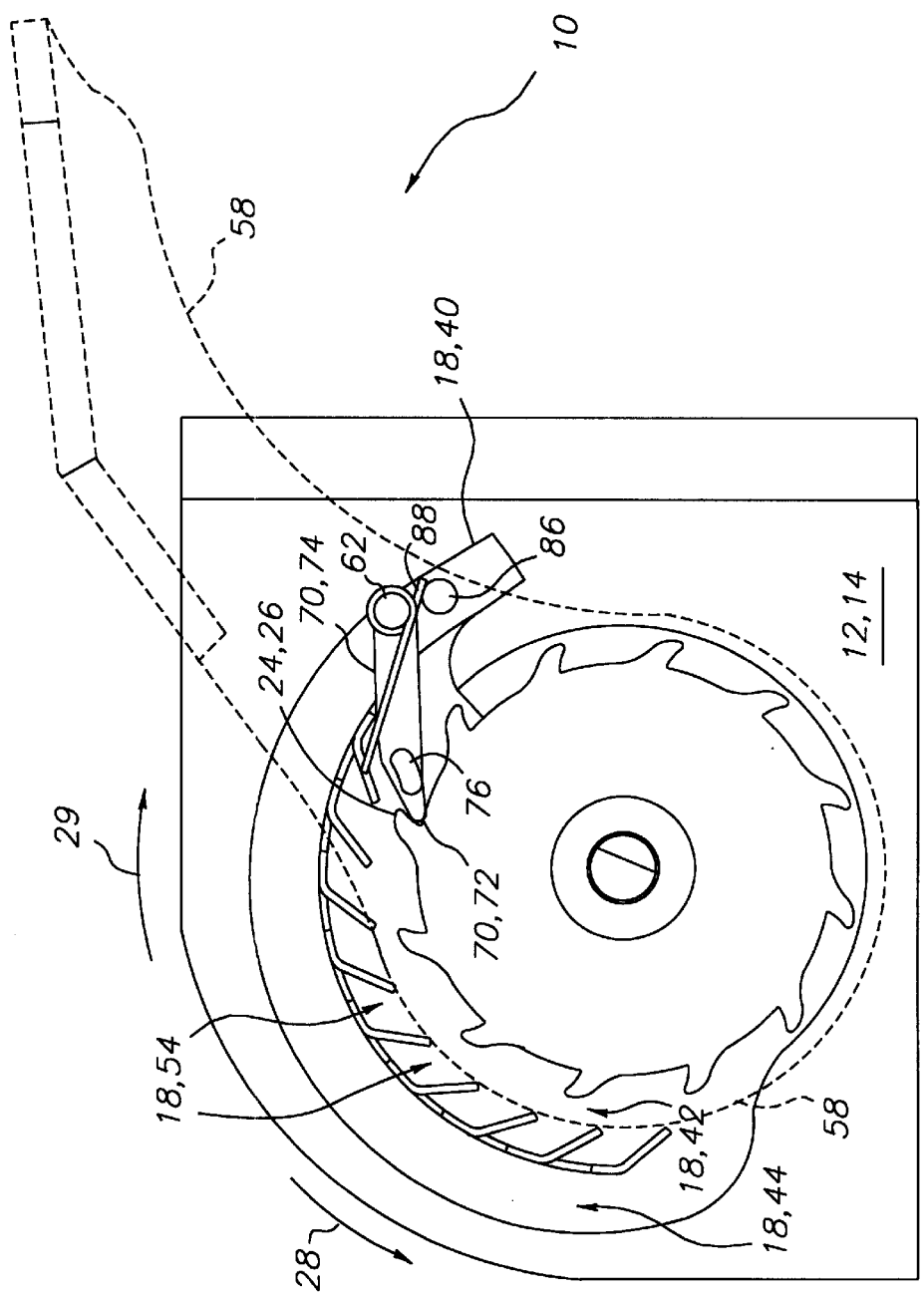
FIG. 8b is the same view as FIG. 8a, but the winder is in a first intermediate position, the arm-pawl is in an extended orientation, and the guide cam and nearest adjoining slat are in a non-deflected condition.
Figure 8C:
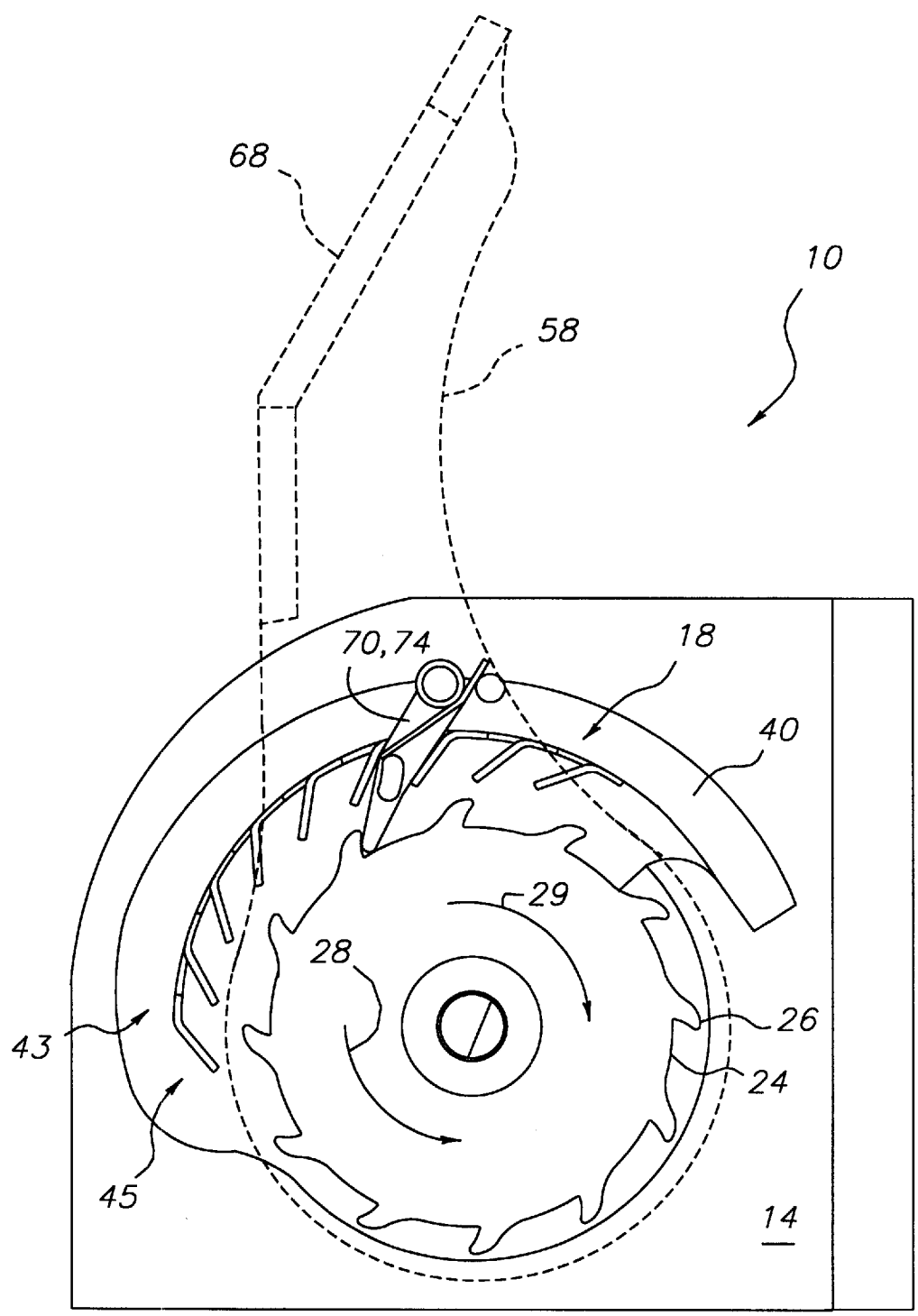
FIG. 8c is the same view as FIG. 8a, but the winder is in a second intermediate position, the arm-pawl is in the extended orientation, and the guide cam and nearest adjoining slat are in a deflected condition.
Figure 8D:
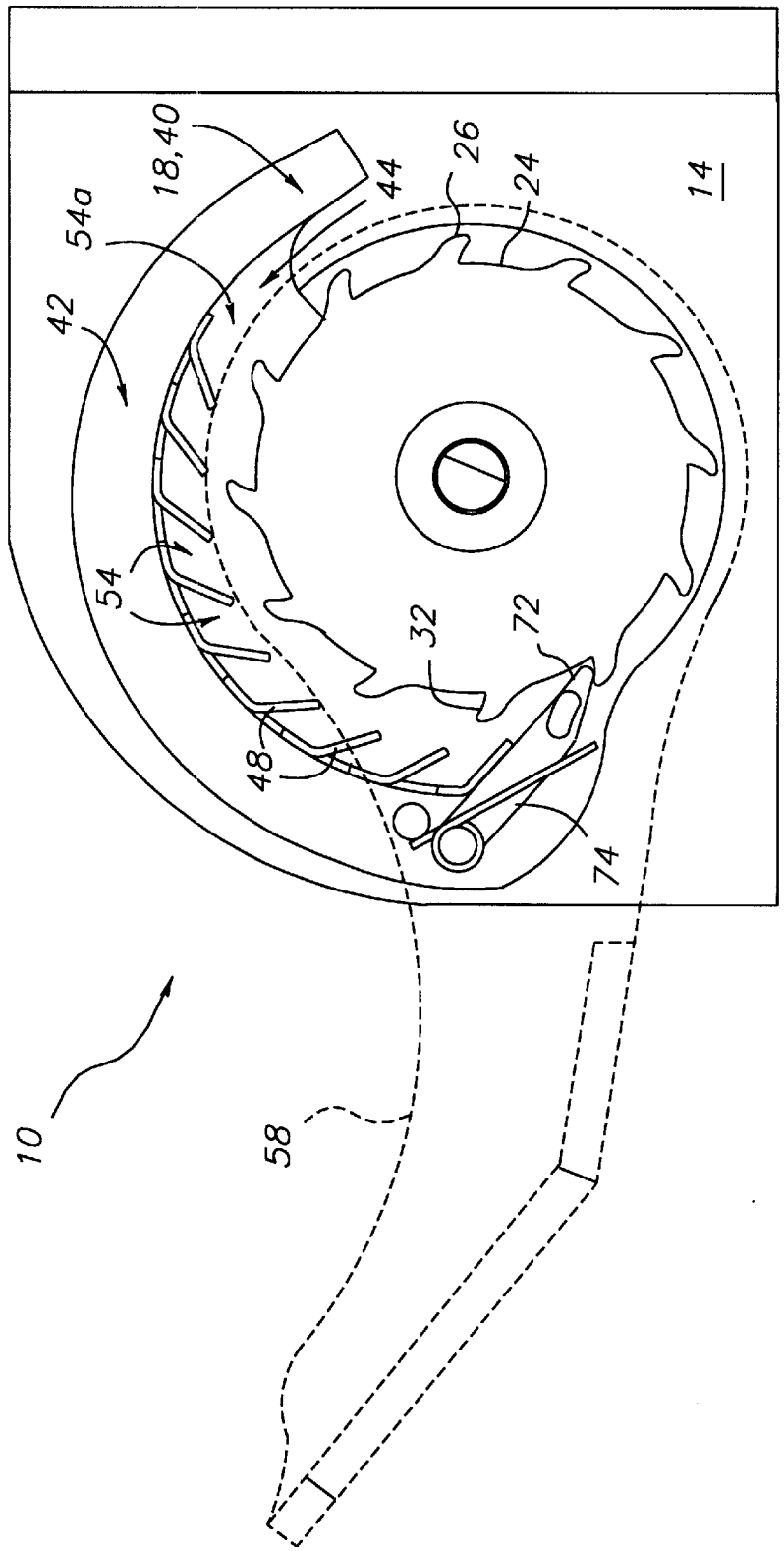
FIG. 8d is the same view as FIG. 8a, but the winder is in a third intermediate position, the arm pawl is in an extended orientation, and the guide cam and nearest adjoining slat are in a non-deflected condition.
Figure 8E:
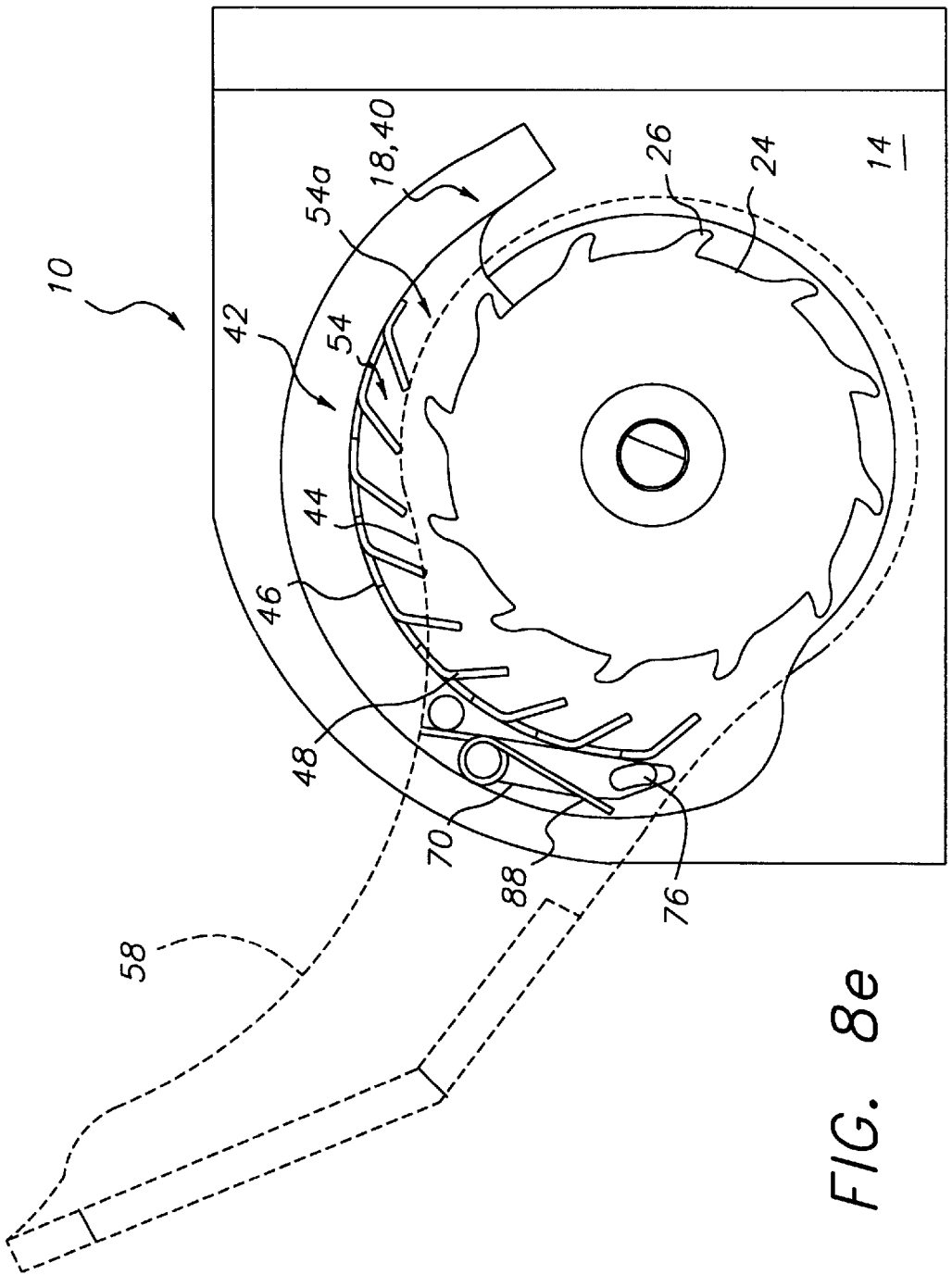
FIG. 8e is the same view as FIG. 8a, but the winder is in a fourth intermediate position, the arm pawl is in the retracted orientation, and the guide cam and nearest adjoining slat are in a non-deflected condition.
Figure 9:
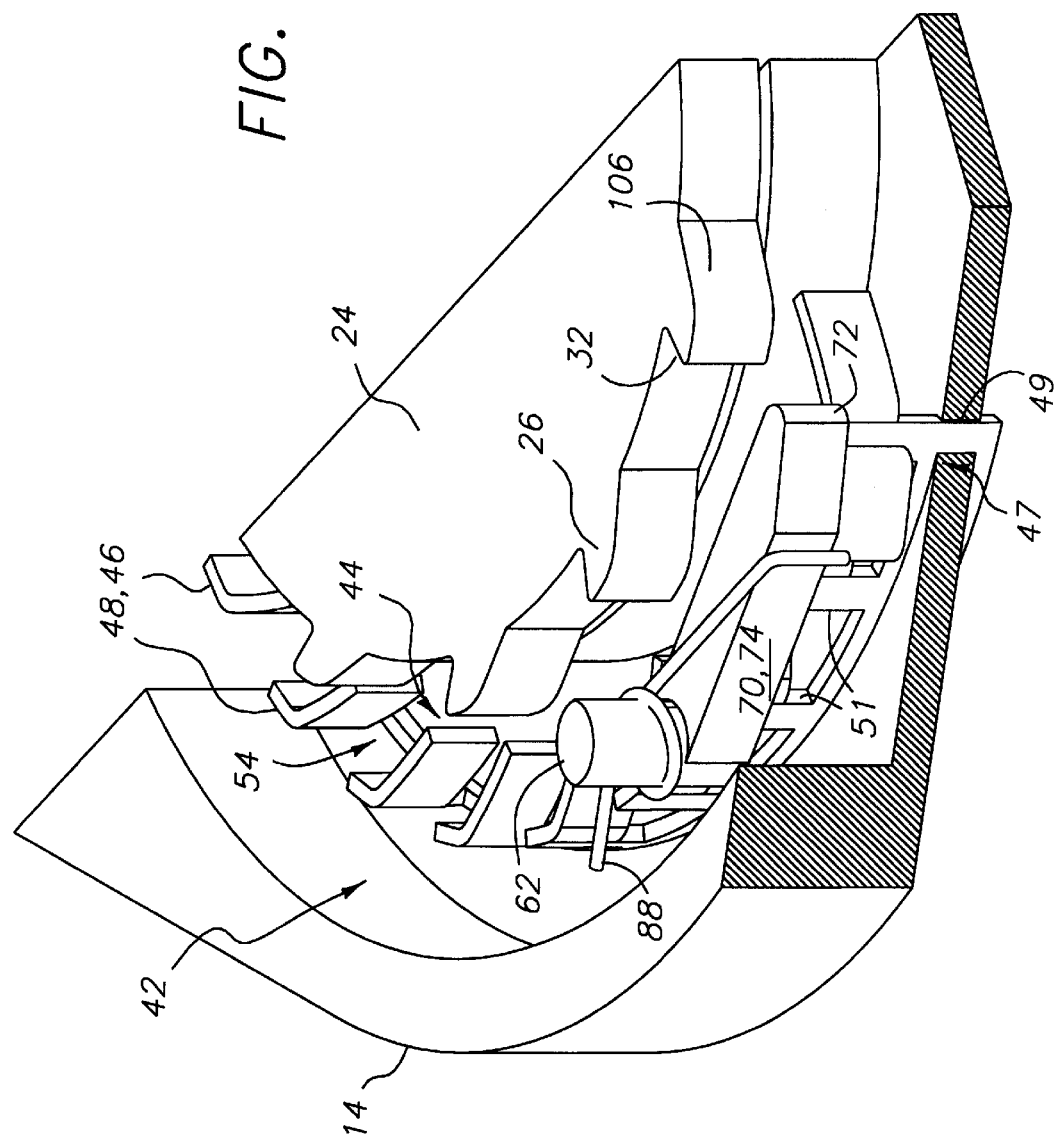
FIG. 9 is a partially cut-away, right-rear, top perspective view of the winder as shown in FIG. 8e.
Figure 10:
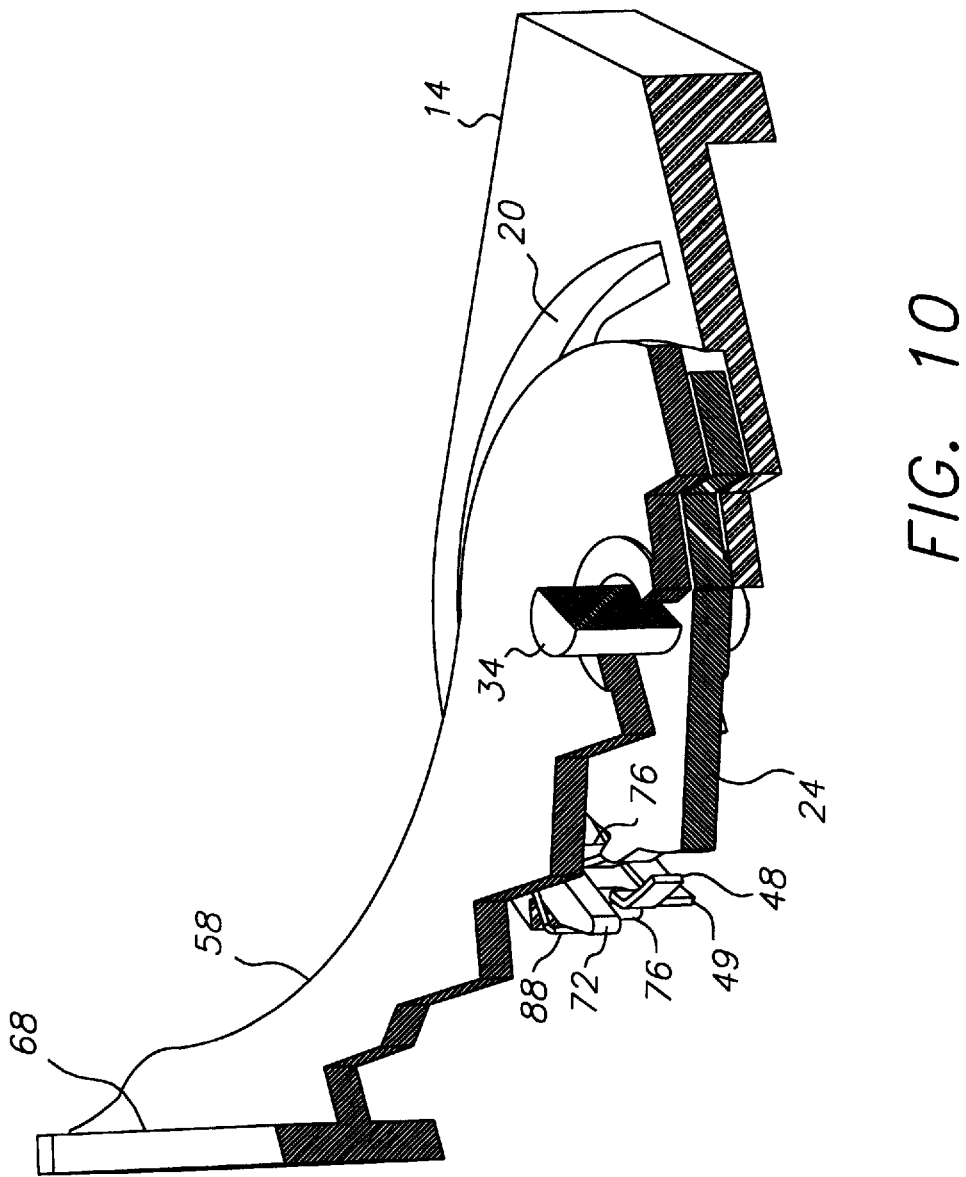
FIG. 10 is a partially cut-away, right-front, top perspective view of the winder as shown in FIG. 8e.
Figure 11:
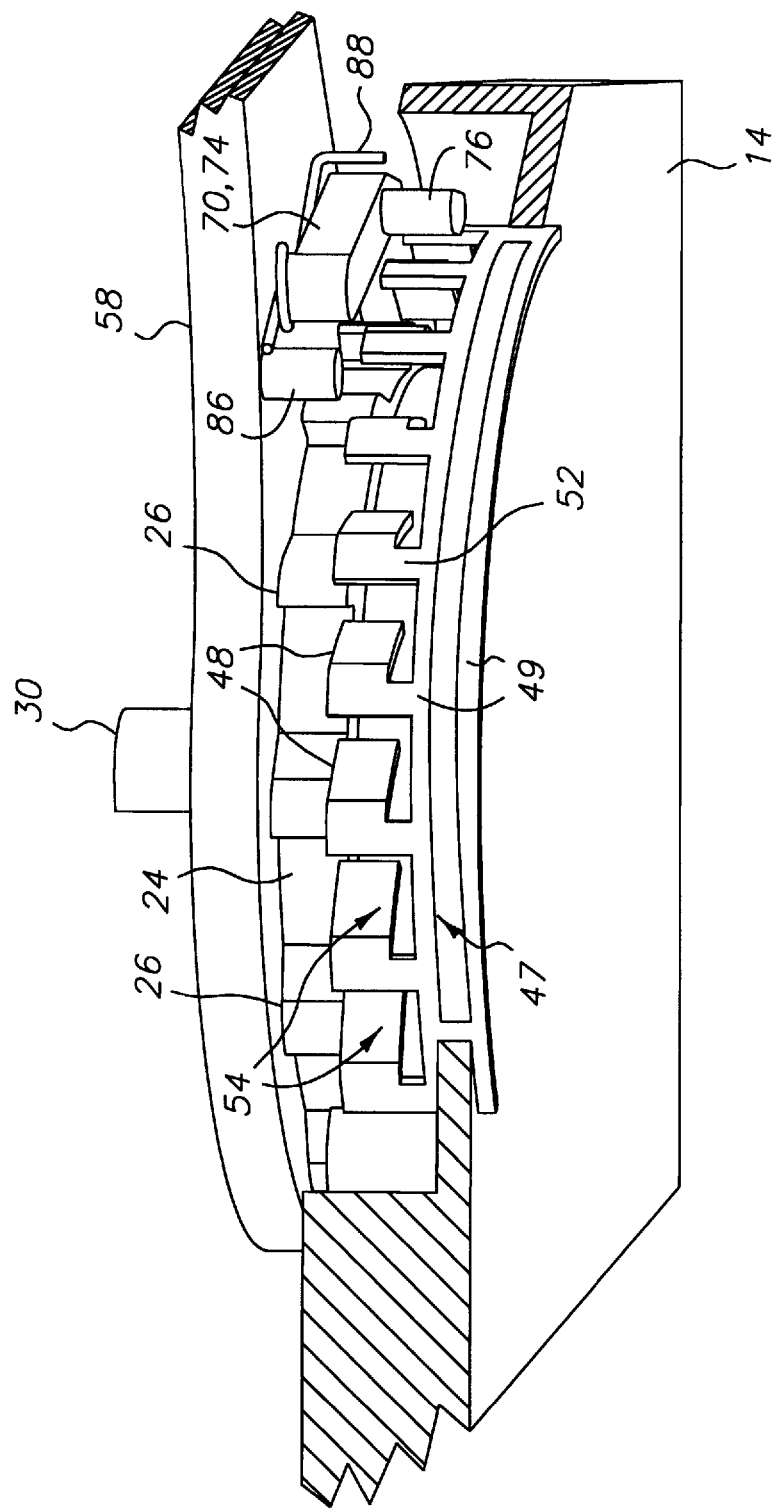
FIG. 11 is a partially cut-away, right-rear, bottom perspective view of the winder as shown in FIG. 8e.

Referring now particularly to FIG. 2, the film advance 108 of the invention includes the one-way winder 10 and a drive element 110 mechanically coupled to and driven by the one-way winder 10. In the embodiment of the invention shown in FIG. 2, the drive element 110 includes a spindle 110a that is mounted in fixed relation to the axle 34 of the ratchet 24 (not shown in FIG. 2) and a metering unit 111. The spindle 110a is configured to grip the spool 112 of a film cartridge 114. FIGS. 12 and 13 show the gear train 116 of an alternative drive element 110, in which the ratchet 24 drives the gear train 116, and the gear train 116 drives a spindle (not shown). Other varieties of film transport would also be suitable and are well known to those of skill in the art. Suitable metering units include both film sprocket wheel and film advance pawl mechanisms.

The camera 118 of the invention has a case 120 defining a pair of film chambers 122,124; configured to receive a film scroll 126 and a film cartridge 114, respectively. The case also defines an exposure area 130 across which the film 132 extends. The camera includes an exposure system 134 disposed to transmit a light image to the exposure area 130. The drive element 110 of the film advance 108 extends into the film cartridge chamber 124 and engages the spool 112 of a loaded film cartridge 114. The camera includes an anti-reverse 133 that engages the film spool 112 and prevents reverse film movement. Film 132 is advanced in the camera 118 by moving the access portion 68 in the forward direction 28. Rotation of the drive element 110 in the forward direction moves the film 132 from the scroll 126 across the exposure area 130 to the cartridge 114. With each advance of a unit length of film 132, the metering unit 111 registers the corresponding film frame in the exposure area 130. The range of rotation of the handle 58 in the camera 118 is largely a matter of convenience and the shape of the particular camera.

As has been described, in the one-way winder 10 of the invention, the pawl 72 is withdrawn from the ratchet 24 during the return movement of the actuator 56. This eliminates a primary source of noise found in conventional ratchet-and-pawl mechanisms. On the other hand, unlike a conventional ratchet-and-pawl mechanism the one-way winder 10 does not function as a brake when it is not being wound, since the actuator 56 is decoupled from the ratchet 24. The lack of a braking function is advantageous for some uses. In the camera 118, metered film is not tensioned by the spindle 110a unless the handle 58 is advanced. This makes it easier for the metering unit 111 to hold the film in place for exposure, without inadvertent film creep or risk of film distortion. If the braking function is desired, then the one-way winder 10 can be used in conjunction with an anti-backup, such as a ratchet-and-pawl mechanism.

The invention has been described in detail with particular reference to certain preferred embodiments thereof, but it will be understood that variations and modifications can be effected within the spirit and scope of the invention.

PARTS LIST winder 10
body 12
panels 14
top panel 14a
middle panel 14b
bottom panel 14c
ratchet receiver 16
guideway 18
pathway 20
handle slot 22
ratchet 24
teeth 26
forward direction 28
return direction 29
ratchet axis 30
engagement portions 32
ratchet axle 34
hole in panel for axle 35
secondary bearing surface 36
bearing surface 37
panel surfaces 38
trunk 40
first and second branches 42,44
tail ends 43,45
fence 46
gap 47
slats 48
support portion 49
forward-guiding surface 50
return-guiding surfaces 52
portals 54
initial portal 54a
final portal 54b
actuator 56
handle spring 57
handle 58
hole in handle for axle 59
director 60
stem 62
pivot axis 64
hole for stem 65
mount portion 66
arrow 67
access portion 68
holding feature 69
arm-pawl 70
pawl 72
arm 74
cam axis 75
guide cam 76
arrow 77
peg 78
arrow 79
hole 80
cam spring 82
stop 84
bolster portion 86
director biasing spring 88
head end 90
tail end 92
area (within the first branch swept by the teeth)—96
entry guide 98
leading edge (of guide cam) 99
moderately sloped surface 100
trailing edge 101
steeply sloped surface 102
guide portion 106
film advance 108
drive element 110
spindle 110a
metering unit 111
spool 112
film cartridge 114
gear train 116
camera 118
case 120
film chambers 122,124
film scroll 126
exposure area 130
film 132
anti-reverse 133
exposure system 134

What is claimed is:

1. A one-way winder comprising:

a body defining a bifurcated guideway having a trunk and first and second branches, said guideway having at least one portal connecting said branches;

a director having an arm-pawl and a guide cam, said director being movable relative to said body in a forward movement and in a return movement, said guide cam moving along said first branch during said forward movement and along said second branch during said return movement, said guide cam being movable unidirectionally along said first branch;

an endless ratchet intruding into said first branch, said endless ratchet being driven by said arm-pawl during said forward movement and spaced apart from said arm-pawl during said return movement.

2. The one-way winder of claim 1 wherein said body includes at least one slat, said slat being disposed in said guideway between said branches, said slat delimiting a plurality of portals extending between said branches, said guide cam being movable bidirectionally through said portals.

3. The one-way winder of claim 2 wherein at least one of said guide cam and said slat is resiliently deflected, substantially silently, by the other of said guide cam and said slat during said forward movement.

4. The one-way winder of claim 2 wherein said slat is resiliently deflectable by said guide cam, from a non-deflected condition wherein said slat interferes with said guide cam during said forward movement.

5. The one-way winder of claim 4 wherein said slat blocks movement of said guide cam along said first branch in said return direction.

6. The one-way winder of claim 2 wherein said arm-pawl is pivotable relative to said guideway, between a retracted orientation, wherein said guide cam is disposed traverse to said slat, and an extended orientation, wherein said guide cam is aligned with said slat; and wherein said arm-pawl is biased toward one of said orientations.

7. The one-way winder of claim 6 wherein said arm-pawl is in said retracted orientation when said arm-pawl is disposed in said second branch; and is disposed in said extended orientation when said arm-pawl is disposed in said first branch.

8. The one-way winder of claim 1 wherein said arm-pawl is biased toward said ratchet.

9. The one-way winder of claim 1 wherein said arm-pawl is biased away from said ratchet and said one-way winder further comprises an entry guide blocking movement of said guide cam from said trunk into said second branch and allowing movement of said guide cam from said second branch into said trunk.

10. A-one-way winder comprising:
a body defining a pathway and a bifurcated guideway having a trunk and first and second branches, said body having a plurality of slats disposed between said branches, said slats defining a plurality of portals extending between said branches;
a director having a stem, a guide cam, an arm extending between said stem and guide cam, and a pawl joined to said arm, said director being movable relative to said body in a forward movement and in a return movement, said stem reciprocating along said pathway with said movements, said guide cam riding in said first branch during said forward movement and in said second branch during said return movement, said guide cam being movable unidirectionally along said first branch;
an endless ratchet intruding into said first branch, said endless ratchet being driven by said pawl during said forward movement and spaced apart from said pawl during said return movement.

11. The one-way winder of claim 10 wherein each said slat is resiliently deflectable by said guide cam during said forward movement, from a non-deflected condition wherein said slat interferes with said forward movement of said guide cam.

12. The one-way winder of claim 10 wherein said slats block movement of said guide cam along said first branch in said return direction.

13. The one-way winder of claim 12 wherein said forward and return movements of said guide cam are substantially silent.

14. A one-way winder comprising:
a body defining a pathway and a guideway, said guideway having first and second branches;
a stem riding in said pathway for movement in a forward direction and a return direction;
a guide cam constrained within said guideway, said guide cam being movable between and through said branches;
an arm-pawl having opposed first and second ends, said first end being joined to said stem, said arm-pawl being joined to said guide cam in spaced relation to said stem, said arm-pawl being pivotable relative to said pathway, between a retracted orientation when said guide cam is disposed in said second branch and an extended orientation when said guide cam is disposed in said first branch;
an endless ratchet driveable relative to said body by said second end of said arm-pawl when said stem moves in said forward direction and said arm pawl is in said extended orientation, said ratchet being spaced apart from said arm-pawl when said stem moves in said return direction and said arm-pawl is in said retracted orientation.

15. The one-way winder of claim 14 wherein said body further comprises a plurality of slats disposed in said guideway, said slats defining a plurality of portals extending between said branches, said slats allowing movement of said guide cam through each said portal in directions toward and away from said ratchet, said slats limiting movement of said guide cam between said portals within said first branch to movement in said forward direction.

16. The one-way winder of claim 15 wherein each said slat is resiliently deflectable by said guide cam during said forward movement, from a non-deflected condition wherein said slat interferes with said forward movement of said guide cam and said slats block movement of said guide cam along said first branch in said return direction.

17. A film advance comprising:
(1) a one-way winder including:
a body defining a bifurcated guideway having a trunk and first and second branches, said guideway having at least one portal connecting said branches;
a director having an arm-pawl and a guide cam, said director being movable relative to said body in a forward movement and in a return movement, said guide cam moving along said first branch during said forward movement and along said second branch during said return movement, said guide cam being movable unidirectionally along said first branch;
an endless ratchet intruding into said first branch, said endless ratchet being driven by said arm-pawl during said forward movement and spaced apart from said arm-pawl during said return movement; and
(2) a film drive mechanically driven by said one-way winder.

18. A camera comprising:
a case defining a pair of film chambers; and
a film advance disposed in operative relation to one of said chambers, said film advance comprising:
(1) a one-way winder including:
a body defining a bifurcated guideway having a trunk and first and second branches, said guideway having at least one portal connecting said branches;

a director having an arm-pawl and a guide cam, said director being movable relative to said body in a forward movement and in a return movement, said guide cam moving along said first branch during said forward movement and along said second branch during said return movement, said guide cam being movable unidirectionally along said first branch;

an endless ratchet intruding into said first branch, said endless ratchet being driven by said arm-pawl during said forward movement and spaced apart from said arm-pawl during said return movement; and (2) a film drive mechanically driven by said one-way winder.

19. A film advance comprising:

(1) a one-way winder including:

a body defining a pathway and a guideway, said guideway having first and second branches;

a stem riding in said pathway for movement in a forward direction and a return direction;

a guide cam constrained within said guideway, said guide cam being movable between and through said branches;

an arm-pawl having opposed first and second ends, said first end being joined to said stem, said arm-pawl being joined to said guide cam in spaced relation to said stem, said arm-pawl being pivotable relative to said pathway, between a retracted orientation when said guide cam is disposed in said second branch and an extended orientation when said guide cam is disposed in said first branch; and an endless ratchet driveable relative to said body by said second end of said arm-pawl when said stem moves in said forward direction and said arm pawl is in said extended orientation, said ratchet being spaced apart from said arm-pawl when said stem moves in said return direction and said arm-pawl is in said retracted orientation; and (2) a film drive mechanically driven by said one-way winder.

20. A camera comprising:

a case defining a pair of film chambers; and a film advance disposed in operative relation to one of said chambers, said film advance comprising:

(1) a one-way winder including:

a body defining a pathway and a guideway, said guideway having first and second branches;

a stem riding in said pathway for movement in a forward direction and a return direction;

a guide cam constrained within said guideway, said guide cam being movable between and through said branches;

an arm-pawl having opposed first and second ends, said first end being joined to said stem, said arm-pawl being joined to said guide cam in spaced relation to said stem, said arm-pawl being pivotable relative to said pathway, between a retracted orientation when said guide cam is disposed in said second branch and an extended orientation when said guide cam is disposed in said first branch; and an endless ratchet driveable relative to said body by said second end of said arm-pawl when said stem moves in said forward direction and said arm pawl is in said extended orientation, said ratchet being spaced apart from said arm-pawl when said stem moves in said return direction and said arm-pawl is in said retracted orientation; and (2) a film drive mechanically driven by said one-way winder.

* * * * *